United States Patent

Murphy et al.

[11] Patent Number: 5,394,203
[45] Date of Patent: Feb. 28, 1995

[54] RETRACTING HEAD UP DISPLAY WITH IMAGE POSITION ADJUSTMENT

[75] Inventors: Morgan D. Murphy; Doyle J. Groves, both of Kokomo, Ind.

[73] Assignee: Delco Electronics Corporation, Kokomo, Ind.

[21] Appl. No.: 254,715

[22] Filed: Jun. 6, 1994

[51] Int. Cl.⁶ ............................................. G03B 21/28
[52] U.S. Cl. ............................................ 353/13; 359/630
[58] Field of Search .................... 353/11, 12, 13, 14; 359/630, 631, 632, 633; 340/705

[56] References Cited

U.S. PATENT DOCUMENTS

| | | | |
|---|---|---|---|
| 4,831,366 | 5/1989 | Iino | 353/14 |
| 4,999,012 | 3/1991 | Suzuki et al. | 353/14 |
| 5,053,755 | 10/1991 | Smith et al. | 353/13 |
| 5,059,956 | 10/1991 | Iino | 353/13 |
| 5,070,323 | 12/1991 | Iino et al. | 353/13 |
| 5,296,868 | 3/1994 | Itami et al. | 353/14 |

*Primary Examiner*—William A. Cuchlinski, Jr.
*Assistant Examiner*—William C. Dowling
*Attorney, Agent, or Firm*—Jimmy L. Funke

[57] ABSTRACT

An opening in a vehicle dash pad allows a HUD reflecting element or mirror to be retracted into the dashboard when not in use. A cover panel hinged to the dash pad supports the mirror and closes the opening when retracted. The panel is joined to a gear arrangement which is controlled by a motor for moving the panel and mirror between storage and operating positions. The mirror is coupled to the panel by a ball joint and the mirror is adjusted about two tilt axes by motor-driven cams for positioning the HUD image in the view of the operator.

9 Claims, 2 Drawing Sheets

RETRACTING HEAD UP DISPLAY WITH IMAGE POSITION ADJUSTMENT

FIELD OF THE INVENTION

This invention relates to a head up display for motor vehicles and particularly to such a display having an adjustable image position when in use and which is retracted when not in use.

BACKGROUND OF THE INVENTION

Head up displays are known for motor vehicle use for displaying speed or other vehicle parameters in or adjacent to the line of sight of the operator to minimize distractions from the roadway view. By projecting a virtual image to the driver the gauge or other information will appear to be outside the vehicle, preferably at about the front of the vehicle. To accomplish this feat, an illuminated image source located beneath the vehicle dash pad is projected onto a reflecting element above the dash pad adjacent the operator view through the windshield. Indeed, the windshield itself is often used as the reflecting element, although windshield curvature introduces image distortions which must somehow be compensated for. It is also known to use a combiner which is a transparent sheet of glass or plastic above the dash pad just behind the windshield, and may be optimally shaped for image reflection, and also allows the roadway to be viewed through it. The reflecting element may also be a silvered mirror; in that case, it is not transparent and should be placed for minimal interference with the roadway scene.

Since the image projection requires an opening in the dash pad, it is feasible to retract the combiner or mirror when not in use and to restore it to operating position when the HUD is desired. Also, if the combiner or mirror is retracted, it becomes possible to cover the opening to keep out dust and other foreign material.

The position of the virtual image for a given optical configuration depends on the eye position of the operator. The image will appear to be higher or lower, depending on the operator's seating height, and it will appear to shift laterally if the operator moves to either side. If the reflecting element is large enough, the image will be visible from a large range of positions. However, to place the image at the position preferred by each operator, the HUD must be adjustable. This has the side benefit of permitting use of a smaller reflecting element.

SUMMARY OF THE INVENTION

It is therefore an object of the invention to store the HUD combiner or other reflecting element when not in use and to restore it above the dash pad when HUD operation is desired, and to adjust the image position.

The invention is carried out by a large movement of the combiner or mirror for movement between storage and operating positions, and a separate fine adjustment of the same element to position the image to suit each operator. While one solution for attaining this double goal is to use a single moving mechanism for coarse movement as well as fine movement of the reflecting element, experience has shown that it is difficult to optimize one goal without compromising the other. Moreover, the coarse movement comprises a large motion about one axis and a complementary fine adjustment would be limited to motion about the same axis. This would permit image adjustment in one direction, say, vertical, but not the other direction.

An opening in the dash pad just to the rear of the windshield allows the HUD reflecting element to be folded down into the opening for storage or extended up for use. A panel or cover which matches the surrounding dash pad is mounted on a support which is hinged at the forward edge of the opening, and the support is connected by a gear mechanism to an electric motor which causes the support and the reflecting element to pivot between the storage and the operational positions. A reflecting element comprising a concave mirror is also mounted on the support adjacent the panel. When the support is moved to storage position, the panel will seat in the opening to blend in with the dash pad and to serve as a dust cover. When it is moved to operating position, the mirror is in position to create the virtual display image.

The reflecting element is centrally pivoted to the panel to permit movement for fine adjustment both vertically and horizontally. Springs at the top and at one side of the element bias the reflecting element to tilt toward the bottom and the left. Two motor-driven cams, one at the bottom and the other on the left, adjust the reflecting element by tilting the element against the springs to a degree depending on the cam rotation. Thus these cams accomplish the fine adjustment under control of the operator.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
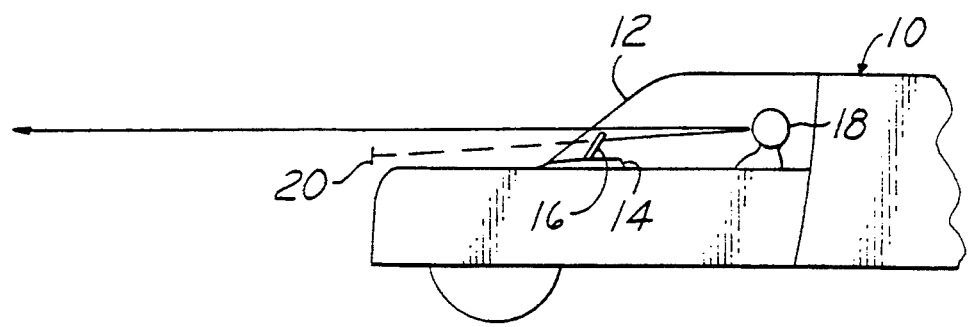
FIG. 1 is a partial elevational view of a vehicle equipped with a HUD according to the invention.

Referring to FIG. 1, a motor vehicle 10 has a windshield 12, a dashboard 14 just to the rear of the windshield, and a HUD combiner or other reflecting element 16 projecting upward from the top of the dashboard. The vehicle operator 18 can view the roadway scene by looking over the reflecting element, and can view vehicle speed or other data by the HUD virtual image 20 which is projected by the reflecting element 16. Generally, for ease of viewing, the virtual image 20 appears to be at the front of the vehicle or even further away.

Figure 2:
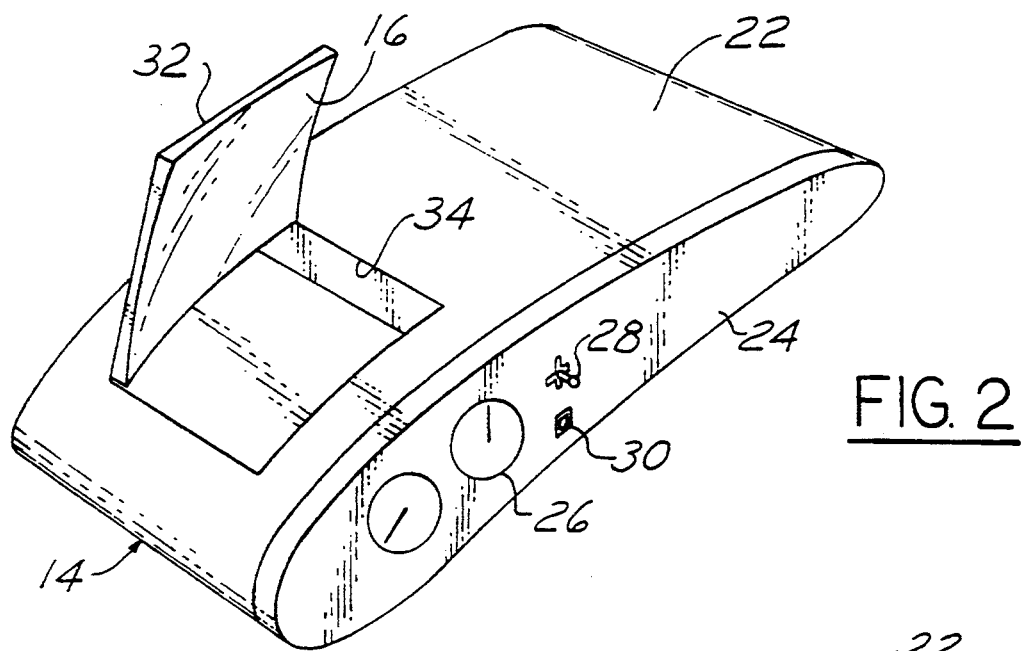
FIGS. 2 and 3 are isometric views of the vehicle dash pad showing the HUD mechanism in storage position and in operating position.
Figure 3:
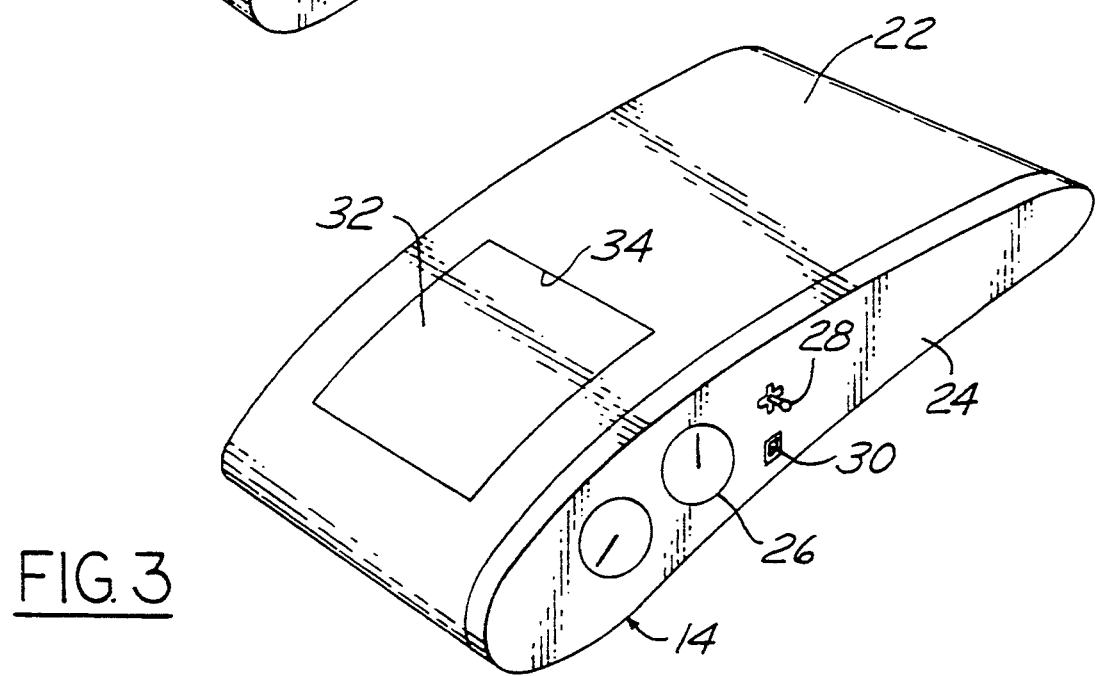

FIGS. 2 and 3 show the vehicle dashboard 14 which comprises a dash pad or top 22 which is generally horizontal, and an instrument panel 24 which is generally vertical and contains instruments 26 as well as an image position adjustment switch knob 28 and a HUD storage switch 30. The reflecting element 16 is a concave mirror facing the operator and is covered on its forward side by a panel 32. An aperture 34 in the dash pad 22 just to the rear of the mirror is sized to receive the mirror 16 and panel 32. The panel 32 and mirror 16 are assembled as a unit for movement together and are hinged at the forward edge of the aperture 34 for folding into the aperture 32 as shown in FIG. 3. In the storage position the panel 32 just fits into the aperture 34, and the panel is finished to blend into the dash pad 22.

Figure 4:
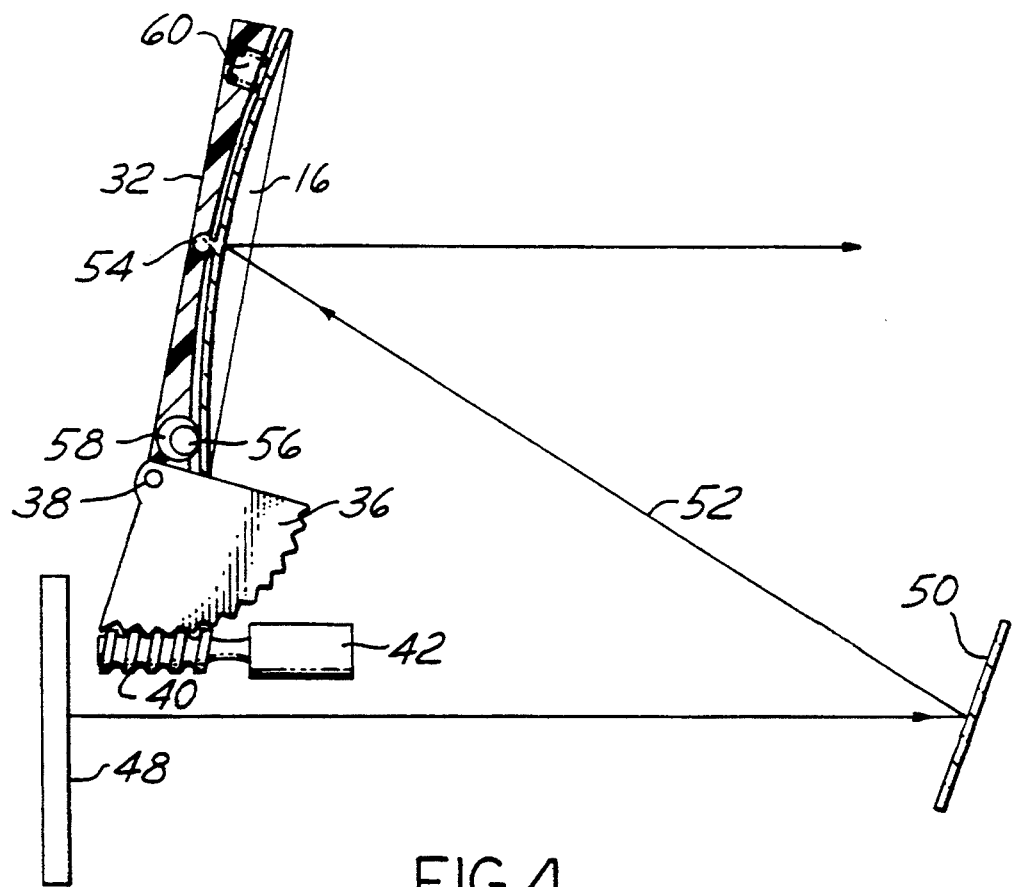
FIG. 4 is a partially sectioned elevational view of the HUD adjustment mechanism according to the invention.
Figure 6:
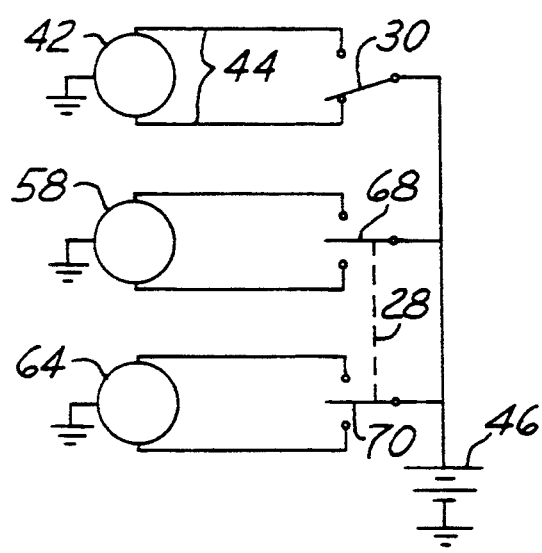
FIG. 6 is a schematic diagram of a motor switching circuit for controlling the HUD mechanism for storage and the adjustment mechanism.

The mechanism for moving the mirror 16 and panel 32 between operating and stored positions is shown in FIG. 4. The panel 32 is mounted along one edge to a sector gear 36 having a pivot or hinge axis 38. The panel and sector gear are the support for the mirror 16. A worm 40 driven by a motor 45 engages the sector gear for moving the panel and thus the mirror about the hinge axis 38. The motor 42, in turn, is controlled by the manually controlled HUD storage switch 30. As indicated in FIG. 6, the switch 30 connects either the forward or the reverse motor lead 44 to a voltage source 46. The HUD optical system is shown in FIG. 4. A display image source 48 such as a vacuum fluorescent display of a liquid crystal display is illuminated in a desired pattern and a folding mirror 50 reflects that pattern onto the concave mirror 16 as indicated by the light ray 52. The mirror 52 directs the image to the operator and is shaped to form a virtual image 20 of the desired size and at the desired distance in front of the vehicle. The position of the observed image depends on the attitude of the mirror 16 and the eye position of the operator 18.

Figure 5:
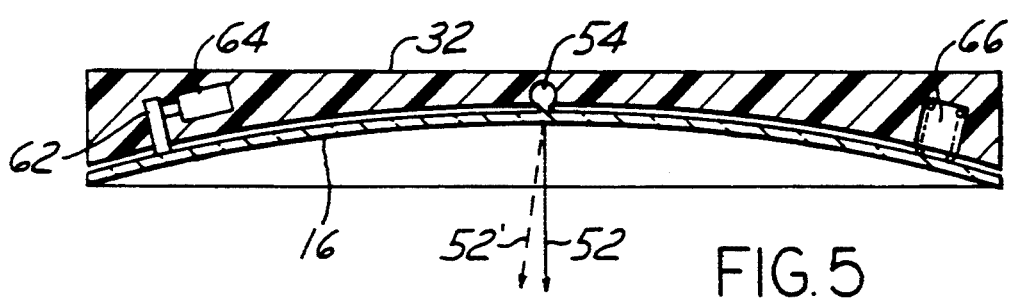
FIG. 5 is a horizontal cross section of the HUD mirror showing the adjustment mechanism according to the invention.

The vertical position of the image 20 is adjusted by tilting the mirror 16 relative to the panel 32 about a horizontal axis while the horizontal position is adjusted by tilting the mirror about a vertical axis. FIG. 4 shows that the mirror 16 is mounted to the supporting panel 32 by a ball and socket arrangement 54 located at the center of the mirror for tilting about either axis. A cam 56 between the panel 32 and mirror 16 engages the lower margin of the mirror 16 and is driven by a motor 58 to move the mirror about the horizontal axis upon rotation of the motor. A spring 60 between the panel and the mirror at the upper edge of the mirror biases the mirror against the cam 56. For horizontal adjustment of the image position, a similar arrangement is shown in FIG. 5. A cam 62 between the panel 32 and mirror 16 engages the left margin of the mirror 16 and is driven by a motor 64 to move the mirror about the vertical axis upon rotation of the motor 64. A spring 66 between the panel and the mirror at the right edge of the mirror biases the mirror against the cam 62. The solid light ray 52 represents the nominal position of the mirror and the dashed light ray 52' represents a tilted position of the mirror. The instrument panel switch knob 28 controls both of the tilt motors 58 and 64 as shown in FIG. 6. The switch knob 28 can be moved in either the horizontal or vertical direction according to the desired image position adjustment. Control switch 68 is operated for vertical adjustment and control switch 70 is operated for horizontal adjustment to selectively rotate the motors 58 and 64.

It will thus be seen that the HUD positioning system allows positioning of the movable reflecting element between storage and operation positions under control of a motor, and fine adjustment of the mirror tilt for image positioning by separate motors, all under operator control. In addition to the motor control switches, a system for remembering the preferred image location and adjusting the mirror for each operator of the vehicle may be included. Such memory and control systems are already known for controlling seat position and rear view mirror position, for example.

While the specific embodiment described here uses a mirror for the external reflecting element, it will be seen that a transparent combiner may be used instead, omitting the cover panel or separately managing the panel. Judicious placement of the springs and control cams will minimize any distraction due to their presence.

The embodiments of the invention in which an exclusive property or privilege is claimed are defined as follows:

1. In a motor vehicle having a dash pad, an adjustable head up display mounted in the dash pad and having a reflecting element for movement between a stored position beneath the dash pad and an operating position above the dash pad adjacent the line of sight of an operator, comprising:

a hinged support bearing the reflecting element;

means coupled to the support for moving the support and the reflecting element between stored and operating positions;

means beneath the dash pad for projecting a display to the reflecting element when in operating position, thereby presenting an image at a position viewable by the operator; and adjustable means mounting the reflecting element on the support for fine adjustment of the image position.

2. The invention as defined in claim 1 wherein the means coupled to the support includes first motor means for moving the support; and the adjustable means includes second motor means for fine adjustment of the reflecting element.

3. The invention as defined in claim 2 wherein the means coupled to the support comprises the first motor means and a gear arrangement for operating the hinged support about a hinge axis to move the reflecting element from its stored position to its operating position.

4. The invention as defined in claim 2 wherein the adjustable means comprises:

a pivot for movably mounting the reflecting element on the support;

cam means driven by the second motor means for adjusting the reflecting element; and spring means for biasing the reflecting element against the cam means.

5. The invention as defined in claim 1 wherein the adjustable means includes:

means for movably mounting the reflecting element on the support for horizontal adjustment of the image; and a motor-driven cam for moving the reflecting element to horizontally adjust the image position.

6. The invention as defined in claim 1 wherein the adjustable means includes:

means for movably mounting the reflecting element on the support for vertical adjustment of the image; and a motor-driven cam for moving the reflecting element to vertically adjust the image position.

7. The invention as defined in claim 1 wherein the adjustable means comprises:

a ball pivot for movably mounting the reflecting element on the support;

first and second cam means for adjusting the reflecting element about first and second axes, thereby allowing adjustment of the image position in two directions; and means for biasing the reflecting element against the cam means.

8. The invention as defined in claim 1 including:

an opening in the dash pad located below the line of sight of a vehicle operator;

the reflecting element being retracted into the opening when moved to the storage position;

a panel for covering the opening in the dash pad when the reflecting element is in stored position, the panel being attached to the hinged support member for movement with the reflecting element.

9. The invention as defined in claim 1 including:

an opening in the dash pad located below the line of sight of a vehicle operator;

the reflecting element being retracted into the opening when moved to the storage position;

a panel for covering the opening in the dash pad when the reflecting element is in stored position, the panel being attached to the hinged support adjacent to the reflecting element;

the adjustable means comprising means for pivotally coupling the reflecting element to the panel and motor driven means between the panel and the reflecting element for tilting the reflecting element to position the image.

* * * * *